3,294,862
POLYCARBONATE RESINS MODIFIED WITH NOVOLAC POLYMERS OR COUMARONE-INDENE POLYMERS
Robert J. Prochaska, Stockbridge, Mass., assignor to General Electric Company, a corporation of New York
No Drawing. Filed Dec. 20, 1962, Ser. No. 245,960
12 Claims. (Cl. 260—829)

This invention relates to thermoplastic resin compositions and more particularly is concerned with improved polycarbonate resin compositions having exceptionally high tensile and flexural moduli.

Aromatic carbonate polymers are well known, commercially available materials having a variety of applications in the plastics art. Such carbonate polymers may be prepared by reacting a dihydric phenol, such as 2,2 bis-(4-hydroxyphenyl) propane (Bisphenol A), with a carbonate precursor such as phosgene, in the presence of an acid acceptor. Generally speaking, aromatic polycarbonate resins offer a high resistance to the attack of mineral acids, may be easily molded, and are physiologically harmless as well as stain resistant. In addition, such polymers have a high impact strength, a high heat resistance, and a dimensional stability far surpassing that of any other commercially available thermoplastic material.

The above properties of polycarbonate resins have rendered them particularly useful in the production of photographic film base. In film form, polycarbonates possess excellent color, clarity, and dimensional stability over a wide range of temperatures and humidity, and are thus well suited in photographic film applications. However, due to the warping and dimensional changes that occasionally occur during the developing and processing of photographic film, there has been considerable demand for a polycarbonate film having a greater stiffness and a higher tensile modulus.

It is well known in the art that the rigidity and stiffness of the thermoplastic resin compositions may be increased by the addition of inorganic fillers to such compositions. For example, Bostwick and Cary [Industrial and Engineering Chemistry, 42, page 848 (1950)] disclose the addition of silicas, carbon black, clays, and calcium and magnesium carbonates to polyethylene for the purpose of imparting increased rigidity and stiffness thereto. In each case, the filled compositions were more rigid but had lower elongations and tear strengths than the unfilled compositions. Similarly, the addition of such inorganic fillers to polycarbonate resin results in an increase in the rigidity of the polycarbonate with a corresponding decrease in the elongation and tear strength. However, the most serious deficiency of such filled polycarbonate resin compositions is that they may not be solution cast into transparent film form suitable for use in photographic film applications.

Other attempts to increase the modulus of a carbonate polymer in a manner such that the polymer could be solution cast into film form have been made by preparing carbonate copolymers from two different dihydric phenols or from a dihydric phenol and a diol or a dibasic acid. Table I below shows the results obtained by preparing copolymers from 2,2 bis-(4-hydroxyphenyl) propane designated as "BPA") and various other difunctional reactants. The mole ratio shown in column 2 designates the ratio of the reactants (as set forth in column 1) in the mixture which was phosgenated to provide the desired copolymer. The tests were conducted on films which had been solution cast from the respective copolymers.

TABLE I

| Polymer | (Mole Ratio) | Tensile Modulus (p.s.i.) 2″ Gage |
|---|---|---|
| BPA Homopolymer (Control) | 100 | 220,000 |
| BPA-2,2 bis-(4-hydroxy-3,5-dichloro phenyl) propane | (95/5) | 215,000 |
| BPA-2,2 bis-(4-hydroxy-3,5-dibromo phenyl) propane | (95/5) | 235,000 |
| BPA-2,2 bis-(4-hydroxy cyclohexyl) propane | (95/5) | 233,000 |
| BPA 2,2 bis-(4-hydroxy-3-methyl-phenyl) propane | (95/5) | 214,000 |
| BPA-Adipic Acid | (90/10) | 235,000 |
| BPA Isophthalic Acid | (90/10) | 255,000 |
| BPA-Terephthalic Acid | (60/40) | 185,000 |
| BPA-Terephthalic Acid | (80/20) | 216,000 |
| BPA-Resorcinol | (90/10) | 219,000 |
| BPA-Hydroquinone | (90/10) | 191,000 |

As seen from Table I above, none of the copolymers prepared exhibit any significant increase in the tensile modulus over that exhibited by the unmodified homopolymeric polycarbonate material.

As far as I am aware, commercially available polycarbonatae resin compositions which may be solution cast to provide films exhibiting tensile moduli of over 300,000 p.s.i. (5″ gage), suitable for use as photographic film have heretofore not been prepared. Unexpectedly, however, I have discovered that such polycarbonate compositions may be prepared by incorporating with a high molecular weight polycarbonate resin, in certain proportions, at least one member of the class consisting of (a) a linear novolac polymer (b) a coumarone-indene polymer (c) a phenol-modified coumarone-indene polymer (d) a phosgenated ortho-ortho novolac polymer and (e) an acetylated linear novolac polymer.

Briefly stated, I have found that when one or more of the above-mentioned modifiers are added to a high molecular weight polycarbonate resin within a certain range, the resultant mixture may be solution cast to provide clear films exhibiting tensile moduli of 300,000 p.s.i. or greater (5″ gage) which are suitable for use in the production of photographic film base. In accordance with my invention, it has been found that a significant increase in modulus is obtained when the modifier is added to the polycarbonate resin in amounts ranging from about 5% to about 40% by weight (of the polycarbonate resin and modifier). Generally speaking, when amounts less than about 5% are used, the improvement in the tensile modulus of the polycarbonate is not readily detectable, and where the amount exceeds about 40%, the mixture begins to lose beneficial properties of the polycarbonate. Preferably, the modifier is added in amounts ranging from about 15% to about 35% of the total weight of the modifier and polycarbonate. Such addition, may be accomplished in any manner so long as a thorough distribution of the modifier and the polycarbonate resin is obtained. For example, the mixing of materials may be accomplished by a variety of methods normally employed for incorporation of plasticizers or fillers into thermoplastic polymers including, but not limited to, powder blenders, mixing rolls, dough mixers, Banbury mixers, extruders, and other mixing equipment. The resulting mixtures may be handled in any conventional manner employed for the fabrication or manipulation of thermoplastic resins. The materials may be formed or molded using compression, injection, calendering and extrusion techniques. It should be understood that the polycarbonate resin mixtures prepared in accordance with the invention may also contain, in addition to one or more of the above mentioned modifiers, other additives to lubricate, prevent oxidation, or lend color to the material. Such additives are well known in the art, and may be incorporated without departing from the scope of the invention.

The resinous mixtures of the invention may be cast into films suitable for use as photographic film base by any one of the well known solution casting techniques. For example, particularly suitable films may be commercially prepared by depositing an organic solvent solution (which previously has been filtered and degassed to assure purity and prevent bubble formation) of the resinous mixture onto a moving belt or drum from a distributing hopper having an adjustable doctor blade (or similar device) for controlling the thickness and uniformity of the polymer solutions so deposited. The organic solvent may then be removed, as by evaporation, for example, by moving the belt or drum through a controlled environment until the polycarbonate film has formed and is self-supporting. Thereafter, the film may be removed continuously from the moving substrate for completion of drying by any of the well known drying processes.

Alternatively, films of the resinous mixtures of the invention may be readily prepared by casting a solution of the resinous mixture onto a stationary substrate, as for example, a smooth glass or metal surface, and moving a doctor blade across the substrate surface to smooth out the solution layer. The organic solvent may then be removed to leave the desired polycarbonate film.

As will be appreciated by those skilled in the art, the organic solvent solution of mixtures of the invention may be prepared by first admixing the modifier with the polycarbonate by any of the above-mentioned mixing techniques, and subsequently dissolving the resinous mixture in the organic solvent, or, alternatively, by adding each component of the mixture (i.e., polycarbonate and modifier) individually to the organic solvent.

In general, any volatile organic solvent inert in the sense that it does not affect the carbonate polymer or a modifier employed, but in which both are soluble, may be used in the film casting process. Examples of suitable solvents are: methylene chloride, 1,2-dichloroethylene, and chloroform.

The novolac resins suitable for use in the practice of the invention are linear polymers which are soluble in methylene chloride, compatible with polycarbonate resins and capable of being fused with polycarbonate resins without undergoing gelation. Such linear novolac resins include the ortho-ortho alkylidene bridged novlac polymers which consist essentially of recurring structural units of the formula (I)

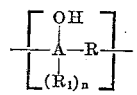

where A is an aromatic radical such as phenyl, diphenyl, naphthyl, tolyl, xylyl, ethylphenyl; R is an alkylidene groups attached to A ortho relative to the hydroxyl group, such as methylene, ethylidene, propylidene, butylidene; $R_1$ is an alkyl radical such as methyl, ethyl, isopropyl, t-butyl, or can be selected from the same group of radicals as A, and is attached to A para relative to the hydroxyl group; and $n$ is a whole number from 0 to 1.

Generally speaking, the ortho-ortho alkylidene bridged novolac polymers falling within the scope of Formula I may be prepared by condensing a phenol having its para position blocked by either an alkyl or an aryl radical, with an aldehyde under standard novolac producing conditions.

Novolac polymers have repeating structural units of the formula

i.e., where $n$ is 0 in Formula I above, may be prepared, for example, by employing a p-halogen phenol in the standard novolac producing reaction, and subsequently removing the halogen from the para position by any of the well known reduction techniques.

A particularly preferred class of novolac polymers falling within the scope of Formula I above which may be used in the practice of the invention contain recurring structural units of the formula

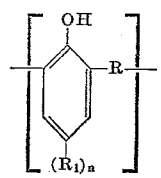

where $R_1$ and $n$ have the meanings given above.

The phenol used for preparing the ortho-ortho novolacs utilized in the present invention may be any phenol in which the sole reactive group is the phenolic hydroxyl group and in which the two ortho positions of the aromatic nucleus to which the hydroxyl group is attached are reactive in the condensation with an aldehyde.

Similarly, any substituted or unsubstituted aldehyde in which the sole reactive group is the carbonyl group may be employed to provide the ortho-ortho novolacs used in the practice of the invention. Among the aldehydes which may be used are, for instance, formaldehyde, acetaldehyde, benzaldehyde, and butyraldehyde. Other phenols and aldehydes which may be employed to provide such novolac polymers will readily occur to those skilled in the art.

Also embraced by the term "linear novolac resins" are the novolac polymers prepared by condensing a phenol which is substituted with an alkyl or an aryl group in the ortho position with an aldehyde under standard novolac producing conditions. Examples of such linear novolac resins are the condensation products of a phenol such as ortho cresol and ortho-tertiary-butyl phenol with aldehydes such as formaldehyde or acetaldehyde.

As will be appreciated by those skilled in the art, the term "linear novolac polymers" as used herein embraces the ortho-ortho novolac polymers such as, for example, those falling within the scope of Formula I, as well as the novolac resins prepared by reacting aldehydes with ortho substituted phenols, or with para substituted phenols, or with mixtures of ortho substituted and para substituted phenols under standard novolac producing conditions.

The phosgenated ortho-ortho novolac resins which may be employed to provide the resinous mixtures of the invention may be prepared by reacting phosgene with a novolac polymer consisting essentially of recurring structural units of Formula I above. Examples of such phosgenated ortho-ortho novolac polymers and methods for their preparation may be found in my copending application Serial No. 241,131, filed November 30, 1962, assigned to the same assignee as the present invention, which by reference is hereby made part of the disclosure and teaching of the instant application.

The coumarone-indene resins suitable for use in the preparation of the resinous mixtures of the invention are well known materials and may be prepared by the direct polymerization of coumarone and indene in the presence of catalysts such as sulfuric acid, phosphoric acid or $BF_3$, for example. Such resins are described in German Patents 392,092 and 394,217 as well as U.S. Patent 1,541,266. Further description of the coumarone-indene resins suitable for use in the practice of the invention may be found in Synthetic Resins and Allied Plastics, Chapter VII, Oxford University Press, 1943. Although the coumarone-indene resins may vary in composition, molecular weight and molecular weight distribution, the series used most advantageously in the practice of the invention have softening temperatures above about 75° C. and a specific gravity above 1.06.

The phenol modified coumarone-indene resins useful in the practice of the invention are also well known materials and are described in Industrial and Engineering Chemistry, 30, 1228–1232 (1938), in German Patent 302,543, as well as U.S. Patents 1,754,052 and 1,857,333. Although these resins may vary in composition, molecular weight and molecular weight distribution, the series which are preferred in the practice of the present invention have softening temperatures above about 50° C. and a specific gravity above 1.1.

The acetylated linear novolac polymers useful in the preparation of the resinous compositions of the invention may be prepared by reacting acetic anhydride with any one of the linear novolac polymers referred to above. For instance, acetic anhydride may be added to a vessel containing a linear novolac polymer and the mixture refluxed until the reaction is complete. The quantity of acetic anhydride used should be sufficient to react with all of the available hydroxyl groups of the linear novolac polymers.

The high molecular weight aromatic carbonate polymers used to provide polycarbonate mixtures of the present invention may be prepared by reacting a dihydric phenol with a carbonate precursor such as phosgene, a haloformate or a carbonate ester. Generally speaking, such carbonate polymers may be typified as possessing recurring structural units of the formula

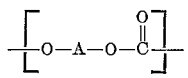

where A is a divalent aromatic radical of the dihydric phenol employed in the polymer producing reaction. By "high molecular weight" aromatic carbonate polymers I refer to carbonate polymers having intrinsic viscosities (as measured in p-dioxane in deciliters per gram at 30° C.) greater than about 0.40 and preferably, above about 0.50. The dihydric phenols which may be employed to provide such aromatic carbonate polymers are mononuclear or polynuclear aromatic compounds, containing as functional groups, 2 hydroxyl radicals, each of which is attached directly to a carbon atom of an aromatic nucleus. Typical dihydric phenols are 2,2 bis-(4-hydroxyphenyl)-propane; 2,2 bis-(4-hydroxyphenyl)-pentane; 2,2 bis-(4-hydroxy 3 methyl phenyl) propane; 2,2 bis (4 hydroxy 3,5 dichloro phenyl) propane; 2,2 bis (4 hydroxy 3,5 dibromo phenyl) propane; 1,1 bis-(4-hydroxyphenyl)-ethane; 4,4' dihydroxy 3,3' dichloro diphenyl ether. A variety of additional dihydric phenols which may be employed to provide such carbonate polymers are disclosed in U.S. Patent 2,999,835, Goldberg, assigned to the assignee of the present invention. It is, of course, possible to employ two or more different dihydric phenols or a dihydric phenol in combination with a glycol, a hydroxy or acid terminated polyester, or a dibasic acid in the event a carbonate copolymer rather than a homopolymer is desired for use in the preparation of the polycarbonate mixtures of the invention.

When a carbonate ester is used as the carbonate precursor in the polymer forming reaction, the materials are reacted at temperatures of from 100° C. or higher for times varying from 1 to 15 hours. Under such conditions ester interchange occurs between the carbonate ester and the dihydric phenol used. The ester interchange is advantageously consummated at reduced pressures of the order of from about 10 to about 100 mm. of mercury, preferably in an inert atmosphere, such as nitrogen or argon, for example.

Although the polymer forming reaction may be conducted in the absence of a catalyst, one may, if desired, employ the usual ester exchange catalysts, such as, for example, metallic lithium, potassium, calcium and magnesium. Additional catalysts and variations in the exchange methods are discussed in Groggins, "Unit Processes in Organic Synthesis" (4th edition, McGraw-Hill Book Company, 1952) pages 616 to 620. The amount of such catalyst, if used, is usually small, ranging from about 0.001 to about 0.1%, based on the moles of the dihydric phenol employed.

The carbonate ester useful in this connection may be aliphatic or aromatic in nature, although aromatic esters, such as diphenyl carbonate, are preferred. Additional examples of carbonate esters which may be used are dimethyl carbonate, diethyl carbonate, phenylmethyl carbonate, phenyltolyl carbonate and di (tolyl) carbonate.

A preferred method for preparing the carbonate polymers suitable for use in providing the high modulus polycarbonate mixtures of the present invention involves the use of a carbonyl halide, such as phosgene, as the carbonate precursor. This method involves passing phosgene gas into a reaction mixture containing the dihydric phenol and an acid acceptor such as a tertiary amine (e.g., pyridine, dimethylaniline, quinoline etc.) The acid acceptor may be used undiluted or diluted with inert organic solvents as, for example, methylene chloride, chlorobenzene, or 1,2 dichloroethane. Tertiary amines are advantageous since they are good solvents as well as acid acceptors during the reaction.

The temperature at which the carbonyl halide reaction proceeds may vary from below 0° C. to above 100° C. The reaction proceeds satisfactorily at temperatures from room temperature (25° C.) to 50° C. Since the reaction is exothermic, the rate of phosgene addition may be used to control the reaction temperature. The amount of phosgene required will generally depend upon the amount of dihydric phenol present. Generally speaking, one mole of phosgene will react with one mole of the dihydric phenol used to provide the polymer and two moles of HCl. Two moles of HCl are in turn "attached" by the acid acceptor present. The foregoing are herein referred to as stoichiometric or theoretical amounts.

Another method for preparing the carbonate polymers which may be used to provide the high-modulus polycarbonate resin mixtures of the invention comprises adding phosgene to an alkaline aqueous suspension of the dihydric phenol used. This is preferably done in the presence of inert solvents such as methylene chloride, 1,2 dichloroethane and the like. Quaternary ammonium compounds may be employed to catalyze the reaction.

A fourth method for preparing such carbonate polymers involves the phosgenation of an agitated suspension of the anhydrous alkali salts of the dihydric phenol used in a non-aqueous medium such as benzene, chlorobenzene, and toluene. This reaction is illustrated by the addition of phosgene to a slurry of the sodium salt of 2,2 bis-(4-hydroxyphenyl)-propane in an inert polymer solvent such as chlorobenzene. The organic solvent should preferably be a polymer solvent but need not necessarily be a good solvent for the reactants.

Generally speaking, the haloformates of dihydric phenols, such as the bishaloformate of 2,2 bis-(4-hydroxyphenyl)-propane, for example, may be substituted for phosgene as the carbonate precursor in any of the methods described above.

In each of the above solution methods of preparation, the carbonate polymer emerges from the reaction in either a true or pseudo solution whether aqueous base or pyridine is used as an acid acceptor. The polymer may be precipitated from the solution by adding a polymer nonsolvent, such as heptane or isopropanol. Alternatively, the polymer solution may be heated to evaporate the solvent.

In order that those skilled in the art may better understand how the present invention may be practiced, the following examples are given by way of illustration and not by way of limitation. All parts and percentages are by weight unless otherwise noted. Tensile modulus measurements were made according to ASTM 1530–58T entitled, "Test for Tensile Modulus of Elasticity of Thin Plastic Sheeting (Tentative)." Comparative (nonstandard) modulus determinations were made with 2" gage specimens for preliminary screening. The 2" gage specimens were obtained from films cast in 3" by 5" metal pans. For more accurate work, larger films (approximately 6" by 36" were cast by knife coating onto a clean plate glass surface with controlled temperature and solvent removal. The tensile modulus was calculated by drawing a tangent to the initial linear portion of the load extension curve, selecting any point on this tangent and dividing the tensile strength (nominal) by the corresponding strain. The result is expressed in pounds per square inch and is reported to three significant figures. As will be appreciated by those skilled in the art, the values of the tensile moduli as used herein are comparative in nature and will depend upon the size of the sample tested, the rate of testing and the temperature at which the tests are conducted.

*Example 1*

100 parts of BPA polycarbonate powder ($\eta_i$ 1.0 in dioxane at 30° C.) was disolved in 400 parts of methylene chloride and the solution filtered and degassed under vacuum to yield a solution having a viscosity of approximately 20,000–25,000 centipoises at 25° C. This solution was doctor blade coated from a hopper containing the dope solution onto the clean plate glass surface to produce a dried film of approximately 7–9 mils thickness after air drying 6–72 hours at 25–35° C., 1–2 hours at 80° C., and finally 3 hours at 125° C. in a circulating air oven. Using a TT-C Instron Testing Machine, the tensile modulus was measured for 1" wide samples using a 5" gage length and found to be 280,000 p.s.i.

When 3 parts of the same BPA polycarbonate powder was dissolved in 30 parts of methylene chloride and the solution poured into 3" x 5" metal pans, a film was obtained which, after drying in the same manner described above, had a tensile modulus of 220,000 p.s.i. for a 2" gage specimen.

*Example 2*

100 parts of a polycarbonate copolymer resin ($\eta_i$ 1.0 in dioxane at 30° C.) prepared by phosgenating a mixture of BPA (97 parts) and isophthalic acid (3 parts) in pyridine-methylene chloride solution was cast into a film with the procedure described in Example 1. The tensile modulus of this copolymer film was found to be substantially identical to that determined for the BPA polycarbonate used in Example 1.

*Example 3*

Several coumarone-indene resins varying in melting point were mixed with the polycarbonate copolymer resin described in Example 2. The three coumarone-indene resins used had a melting range of 108–117° C., 110–120° C., 120–130° C., designated A, B and C respectively. Thirty-five parts of each resin was mixed with 65 parts of the polycarbonate copolymer resin and dissolved in 175 ml. methylene chloride. Each of the three solutions were filtered and degassed and cast on the clean plate glass as described above. After drying by the standard procedure, the films had the following tensile modulus values, using a 5" gage length:

| | P.s.i. |
|---|---|
| A | 394,000 |
| B | 383,000 |
| C | 375,000 |

These values are approximately 40% higher than those for the unmodified polycarbonate.

*Example 4*

Using a phenol modified coumarone-indene resin having a softening point of 76° C. and a specific gravity of 1.144, several mixtures with the polycarbonate resin described in Example 1 were made up as follows:

| | Parts |
|---|---|
| Phenol modified coumarone-indene | 15 |
| Phenol modified coumarone-indene | 25 |
| Phenol modified coumarone-indene | 35 |
| Polycarbonate | 85 |
| Polycarbonate | 75 |
| Polycarbonate | 65 |

These mixtures were designated as D, E and F respectively, and each mixture was dissolved in 175 ml. methylene chloride and cast into films on clean plate glass by the standard technique. After drying by the standard procedure, the films had the following tensile modulus values, using a 5" gage length:

| | P.s.i. |
|---|---|
| D | 325,000 |
| E | 376,000 |
| F | 404,000 |

These values illustrate the effect of additive concentration.

*Example 5*

A similar experiment was performed using a novolac resin prepared by standard techniques using a 0.8 to 1 mole ratio of formaldehyde to p-cresol. The novolac resin was mixed with the polycarbonate resin described in Example 1, as follows:

| | Parts |
|---|---|
| p-Cresol novolac | 15 |
| p-Cresol novolac | 35 |
| Polycarbonate | 85 |
| Polycarbonate | 65 |

These mixtures are designated G and H respectively and each mixture was dissolved in 300 parts methylene chloride and cast on clean plate glass by the standard technique. After drying by the standard procedure, the films had the following tensile modulus values, using a 5" gage length:

| | P.s.i. |
|---|---|
| G | 365,000 |
| H | 435,000 |

*Example 6*

35 parts novolac resin prepared from o-cresol and formaldehyde (1 to 0.8 mole ratio) was mixed with 65 parts of the polycarbonate copolymer described in Example 2 and the mixture dissolved in 175 ml. methylene chloride. After casting and drying, the tensile modulus on a 5" gage length was found to be 442,000 p.s.i., almost 60% greater than the polycarbonate copolymer containing no additive.

*Example 7*

Novolac resins were prepared by reacting mixtures of p-tert.-butylphenol and p-cresol with formaldehyde. Two different novolacs J—20 parts p-t-butylphenol, 80 parts p-cresol.
K—10 parts p-t-butylphenol, 90 parts p-cresol.

were prepared. Each novolac was mixed with the polycarbonate copolymer described in Example 2 (35 parts novolac, 65 parts polycarbonate copolymer). After dissolving each mixture in 175 ml. methylene chloride, casting and drying, the modulus values for each film, using a 5" gage length, were determined to be:

| | P.s.i. |
|---|---|
| J | 375,000 |
| K | 396,000 |

*Example 8*

25 parts of a soluble, fusible condensation product of a p-cresol formaldehyde novolac and phosgene, described in my copending application Serial No. 241,131, was mixed with 75 parts of the polycarbonate resin described in Example 1. After dissolving in 300 parts methylene chloride, casting and drying, the resulting film was found to have a tensile modulus of 313,000 p.s.i. for a 5" gage length.

Example 9

100 parts of the o-cresol formaldehyde novolac used in Example 6 was mixed with 160 parts acetic anhydride, 5 drops concentrated sulfuric acid, and heated for 1½ hours. The reaction product was precipitated with water, washed to remove excess acetic acid and dried. The dried product showed no phenolic hydroxyl on infrared analysis, indicating essentially complete acetylation. 35 parts of this acetylated novolac was mixed with 65 parts of the polycarbonate copolymer described in Example 2 and the mixture dissolved in 175 ml. methylene chloride. After casting and drying by standard procedure, the film was found to have a tensile modulus on a 5″ gage length of 418,000 p.s.i.

Example 10

Several polycarbonate homopolymers and copolymers, other than those described in Examples 1 and 2, were mixed with a coumarone-indene resin (softening range 108–117° C.) and the tensile modulus measured on each film. In each case, 2.6 parts of the polymer or copolymer were mixed with 1.4 parts of the coumarone-indene resin and the mixture dissolved in 40 parts methylene chloride, cast in 3″ x 5″ metal pans, and dried in the usual manner. Four parts of each polymer or copolymer without the additive was dissolved in 40 parts methylene chloride and cast in 3″ x 5″ metal pans and dried in the usual manner. The mole ratio shown in column 2 designates the ratio of the reactants (as set forth in column 1) which was phosgenated to provide the desired copolymer. The tensile modulus for each film was measured for a 2″ gauge length, with result as follows:

| Polymer | (Mole Ratio) | Modulus (p.s.i.) No Additive | Modulus (p.s.i.) 35% Additive |
|---|---|---|---|
| BPA/Resorcinol | (90/10) | 219,000 | 310,000 |
| BPA/Adipic Acid | (90/10) | 235,000 | 276,000 |
| BPA/Isophthalic Acid | (60/40) | 204,000 | 267,000 |
| 2,2 bis(4-hydroxy-3-methylphenyl) propane (homo-polymer) | (100) | 219,000 | 257,000 |
| 2,2 bis-(4-hydroxy, 3,5-dichlorophenyl) propane (homo-polymer) | (100) | 256,000 | 287,000 |

While the foregoing examples specifically illustrate the utility of the invention in connection with the production of particular products, namely, films which exhibit high tensile modulus, the polycarbonate resin mixtures of the invention additionally may be used in the manufacture of any product where the increase in tensile modulus results in improved dimensional stability as well as retaining transparency. Thus, in addition to films useful in the photographic and graphic arts the resinous compositions may also be used to prepare molded parts, as illustrated in the following example:

Example 11

709 parts of BPA polycarbonate resin ($\eta_1$ 0.58 in dioxane at 30° C.) were mixed with 382 parts coumarone-indene resin (softening point 155° C.) and the mixture extruded in a No. ½ John Royle Extruder at 450–470° F. The extrudate was pelletized and the pellets injected molded into ½″ x ⅛″ x 2½″ bars at 450–500° F. The flexural modulus of these bars was determined to be 420,000 p.s.i. compared to a flexural modulus of 340,000 p.s.i. for the BPA polycarbonate containing no additive.

Generally speaking, the resin mixtures of the invention may be used in the production of any molded part where high structural strength and transparency are required, as for example, fan blades and pump impellers where greater flexural modulus will reduce flexing and vibration, as well as housings where greater rigidity imparts greater strength and dimensional stability.

What I claim as new and desire to secure by Letters Patent of the United States is:

1. A resin composition comprising
   (1) a high molecular weight aromatic polycarbonate resin and
   (2) from about 5 to about 40% by weight of a modifier based on the weight of the polycarbonate and said modifier selected from the class consisting of
      (a) a linear novolac polymer which is soluble in methylene chloride and which is an ortho-ortho alkylidene bridged novolac polymer based on the weight of the polycarbonate and said novolac polymer;
      (b) an acetylated linear novolac polymer wherein all of the available hydroxyl groups are acetylated based on the weight of the polycarbonate and said novolac polymer;
      (c) a phosgenated ortho-ortho novolac polymer;
      (d) a coumarone-indene polymer; and
      (e) a phenyl modified coumarone-indene polymer.

2. A resin composition comprising
   (1) a high molecular weight aromatic polycarbonate resin and
   (2) from about 5% to about 40% by weight of a linear novolac polymer which is soluble in methylene chloride and which is an ortho-ortho alkylidene bridged novolac polymer based on the weight of the polycarbonate and said novolac polymer.

3. A resin composition comprising
   (1) a high molecular weight aromatic polycarbonate resin and
   (2) from about 5% to about 40% by weight of an acetylated linear novolac polymer wherein all of the available hydroxyl groups are acetylated based on the weight of the polycarbonate and said novolac polymer.

4. A resin composition comprising
   (1) a high molecular weight aromatic polycarbonate resin and
   (2) from about 5% to about 40% by weight of a phosgenated ortho-ortho novolac polymer based on the weight of the polycarbonate and said novolac polymer.

5. A resin composition comprising
   (1) a high molecular weight aromatic polycarbonate resin and
   (2) from about 5% to about 40% by weight of a coumarone-indene polymer based on the weight of the polycarbonate and said coumarone-indene polymer.

6. A resin composition comprising
   (1) a high molecular weight aromatic polycarbonate resin and
   (2) from about 5% to about 40% by weight of a phenol modified coumarone-indene polymer based on the weight of the polycarbonate and said coumarone-indene polymer.

7. A resin composition comprising
   (1) a high molecular weight aromatic polycarbonate resin and
   (2) from about 5 to about 40% by weight of a linear novolac polymer which is the condensation product of p-cresol and formaldehyde based on the weight of the polycarbonate and said novolac polymer.

8. A resin composition comprising
   (1) a high molecular weight aromatic polycarbonate resin and
   (2) from about 5 to about 40% by weight of a linear novolac polymer which is the condensation product of o-cresol and formaldehyde based on the weight of the polycarbonate and said novolac polymer.

9. A resin composition comprising
   (1) poly (p,p′ diphenyl propane) carbonate and
   (2) from about 5 to about 40% by weight of a modifier based on the weight of the polycarbonate in said modifier selected from the class consisting of:
  (a) a linear novolac polymer which is soluble in methylene chloride and which is an ortho-ortho alkylidene bridged novolac polymer based on the weight of the polycarbonate and said novolac polymer;
  (b) an acetylated linear novolac polymer wherein all of the available hydroxyl groups are acetylated based on the weight of the polycarbonate and said novolac polymer;
  (c) a phosgenated ortho-ortho novolac polymer;
  (d) a coumarone-indene polymer; and
  (e) a phenol modified coumarone-indene polymer.

10. A film of the resin composition of claim 1.
11. A film of the resin composition of claim 9.
12. A method for improving the tensile and flexural moduli of a high molecular weight polycarbonate resin which comprises mixing the resin wtih a modifier comprising at least one member of the class consisting of:
  (a) a linear novolac polymer which is soluble in methylene chloride and which is an ortho-ortho alkylidene bridged novolac polymer based on the weight of the polycarbonate and said novolac polymer;
  (b) an acetylated linear novolac polymer wherein all of the available hydroxyl groups are acetylated based on the weight of the polycarbonate and said novolac polymer;
  (c) a phosgenated ortho-ortho novolac polymer;
  (d) a coumarone-indene polymer; and
  (e) a phenol modified coumarone-indene polymer, said modifier being added to said resin in an amount ranging from about 5% to about 40% by weight of modifier based on the weight of the polycarbonate and said modifier and resin.

References Cited by the Examiner

UNITED STATES PATENTS 2,950,266   7/1960   Goldblum _____ 260—842

MURRAY TILLMAN, *Primary Examiner.*

E. J. TROJNAR, P. LIEBERMAN, *Assistant Examiners.*